J. E. DUNN.

VACUUM EVAPORATOR OR HEATER.

APPLICATION FILED DEC. 5, 1910.

Reissued May 30, 1911. 13,245.

WITNESSES:

Robt. R. Ketchel.

Jos. G. Dempsey

INVENTOR

Joseph E. Dunn

BY Charles N. Butler

ATTORNEY.

UNITED STATES PATENT OFFICE.

JOSEPH E. DUNN, OF PHILADELPHIA, PENNSYLVANIA.

VACUUM EVAPORATOR OR HEATER.

13,245. Specification of Reissued Letters Patent. Reissued May 30, 1911.

Original No. 906,517, dated December 15, 1908, Serial No. 388,746. Application for reissue filed December 5, 1910. Serial No. 595,771.

*To all whom it may concern:*

Be it known that I, JOSEPH E. DUNN, a British subject, formerly a resident of Santiago, Cuba, now of Philadelphia, Pennsylvania, have invented a new and useful Vacuum Evaporator or Heater, of which the following is a specification.

This invention relates to the construction of vacuum pans for the evaporation and concentration of liquids, or to be used for heating or distilling purposes.

The object of the invention is to provide an improved apparatus in which the temperature of the liquid may be quickly raised by dividing it into thin films which are caused to flow between highly heated surfaces.

The invention consists in a vacuum evaporator or heater, constructed and arranged as hereinafter set forth and claimed.

Figure 1:
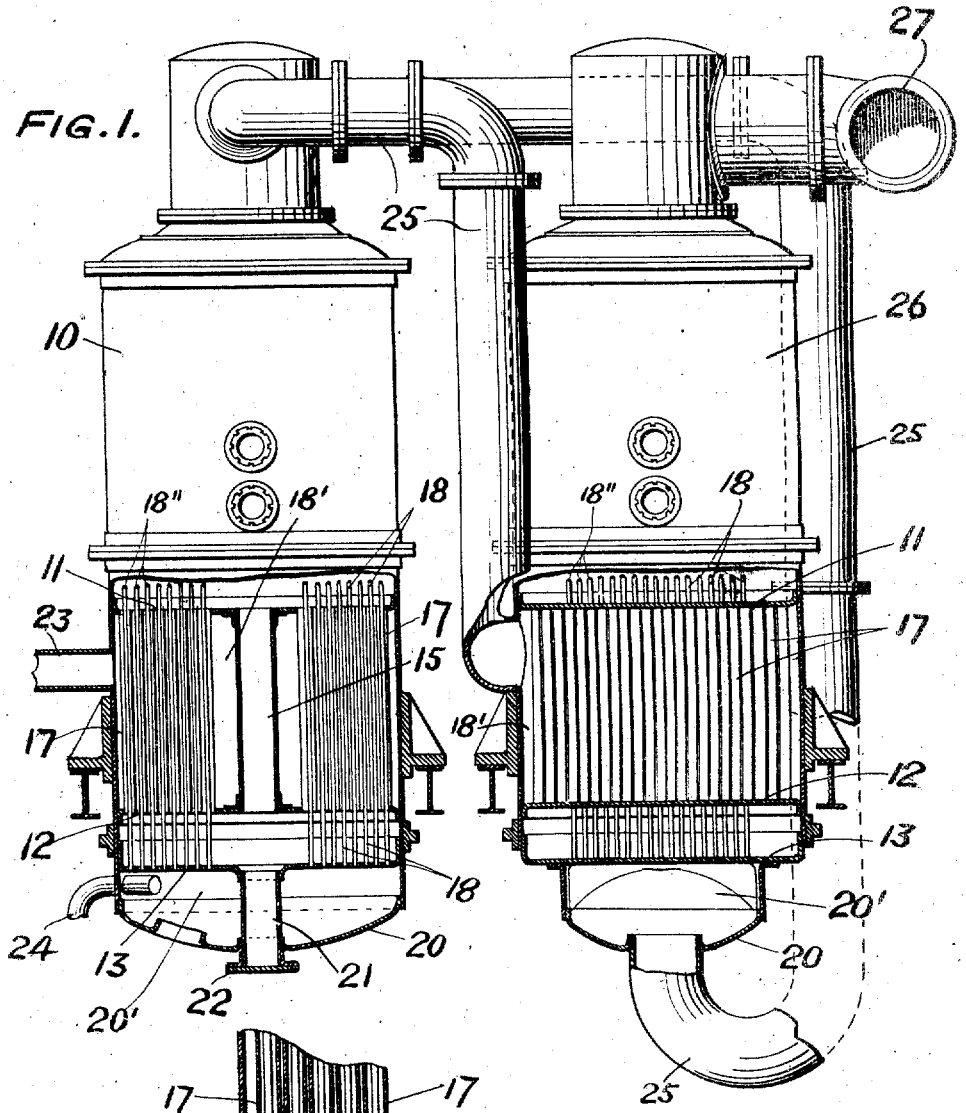
Figure 2:
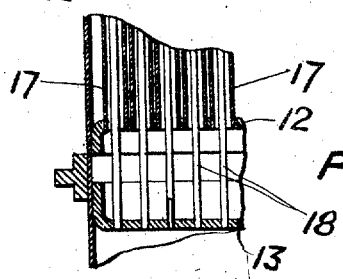

In the accompanying drawings:—Figure 1 is a sectional elevation of a double effect vacuum pan provided with heating apparatus embodying the invention. Fig. 2 is a detail view in vertical section of a portion of the lower end of one of the pans in Fig. 1.

Similar numerals of reference are employed to indicate corresponding parts throughout both figures of the drawings.

The pan 10 is of any desired capacity and secured within its lower portion are three plate or sheet members 11, 12 and 13, all of which are provided with centrally disposed openings having flanged walls. Extending from the sheet 11 to sheet 12 is a central circulating tube 15 through which the liquid being heated passes down from the upper portion or separator chamber of the pan to the lower space or supply chamber between the sheets 12 and 13.

Secured to the sheets 11 and 12 are the ends of tubes 17 through which the liquid circulates and extending through these tubes 17 are smaller tubes 18, the lower open ends of which are secured to the lower tube sheet 13. The upper ends of the tubes 18 contain small openings 18″ to permit a restricted flow therethrough, and such upper ends extend above the sheet 11 and tubes 17 to prevent liquid from working into the tubes 18 through the openings 18″. The lower tube sheet 13 has a centrally disposed flanged opening which is connected to an opening in the lower flanged head 20 by a tube 21, the lower end of this tube 21 being normally closed by a cap 22.

The space around the tubes 17 between the upper end and the lower tube sheets 11 and 12 forms a steam box 18′ into which steam passes at any desired temperature through a feed pipe 23. Steam is, also, admitted through a pipe 24 to the lower steam box 20′ formed between the tube sheet 13 and the lower head 20.

The steam passes upward into the small tubes 18, and any water of condensation which may form therein will flow by gravity down into the lower steam box 20′. The steam will, also, inclose and heat the larger tubes 17, and each pair of tubes 17, 18, is arranged to form a very narrow passage, so that a mere film of liquid will be acted upon and its temperature quickly raised to a very high point. The pipes 15 and 21 extending through the upper and lower steam chambers will aid in heating the circulating liquid.

The vapor is drawn off through a pipe 25 which connects with the two steam spaces of the second pan 26, the construction of this pan being the same as that previously described, and the vapor from this latter pan passes off through a discharge pipe 27 to a third pan or to a condenser.

I claim:—

1. In an evaporator, a casing, a liquid chamber in the upper part of the casing; an upper and lower steam chamber in said casing; a lower liquid chamber located between said steam chambers; liquid circulating pipes open at each end, and extending through the upper steam chamber, and connecting the said lower liquid chamber with the liquid chamber in the upper part of the casing; steam pipes extending through and concentric with said circulating pipes, and projecting up into the upper liquid chamber, and extending through the lower liquid chamber, and communicating with the lower steam chamber; a central liquid circulating pipe extending through the upper steam chamber, and communicating with the upper and lower steam chambers; and a second liquid circulating pipe extending through the lower steam chamber, and opening into the lower liquid chamber.

2. In an evaporator, a steam chamber, a supply chamber, a separator chamber, a set of tubes connecting said supply chamber with said separator chamber and passing through said steam chamber, a second steam chamber, and a set of tubes passing from said second steam chamber through said supply chamber and said tubes first named into said separator chamber, said second named tubes extending into said separator chamber and having vents in the tops thereof.

3. In an evaporator, a heating chamber, a supply chamber, a separator chamber, tubes connecting said supply chamber with said separator chamber, a second heating chamber, tubes passing from said second heating chamber through said supply chamber and said tubes first named and a return passage connecting said separator chamber with said supply chamber.

4. In an evaporator, a heating chamber, a supply chamber, a separator chamber, evaporating tubes leading from said supply chamber through said heating chamber to said separator chamber, a centrally disposed return passage leading from said separator chamber to said supply chamber, a second heating chamber and tubes communicating with said second heating chamber and extending through said supply chamber and said tubes first named into said separator chamber, said second named tubes having vents in the ends thereof in said separator chamber beyond said first named tubes.

5. In an evaporator, a pan having a heating chamber, a supply chamber, a separator chamber, tubes connecting said supply chamber with said separator chamber and passing through said heating chamber, a second heating chamber, and tubes passing from said second heating chamber through said supply chamber into said tubes first named, in combination with a second pan having a separator chamber, and means for delivering vapor from said last named separator chamber to said heating chambers.

In witness whereof I have hereunto set my name this 19th day of November, 1910, in the presence of the subscribing witnesses.

JOSEPH E. DUNN.

Witnesses:

Jos. G. Denny, Jr.,

Robt. R. Ketchel.

---

Copies of this patent may be obtained for five cents each, by addressing the "Commissioner of Patents, Washington, D. C."